United States Patent
Satienpoch et al.

(10) Patent No.: US 9,243,565 B2
(45) Date of Patent: Jan. 26, 2016

(54) GAS TURBINE ENGINE FUEL SYSTEM METERING VALVE

(75) Inventors: Montira Satienpoch, Enfield, CT (US); Todd Haugsjaahabink, Springfield, MA (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 580 days.

(21) Appl. No.: 13/610,987

(22) Filed: Sep. 12, 2012

(65) Prior Publication Data
US 2014/0069102 A1 Mar. 13, 2014

(51) Int. Cl.
F02C 7/232 (2006.01)
F16K 11/074 (2006.01)
F16K 11/07 (2006.01)

(52) U.S. Cl.
CPC ............... *F02C 7/232* (2013.01); *F16K 11/07* (2013.01); *Y10T 137/86863* (2015.04)

(58) Field of Classification Search
CPC ................................. F16K 11/07; F02C 7/232
USPC .................. 137/625.18, 625.47, 595; 60/734
See application file for complete search history.

(56) References Cited

U.S. PATENT DOCUMENTS

| | | | | |
|---|---|---|---|---|
| 3,696,839 | A | * 10/1972 | Irie | 137/625.61 |
| 4,324,274 | A | * 4/1982 | Golan et al. | 137/625.68 |
| 4,607,486 | A | 8/1986 | Cole | |
| 4,745,747 | A | 5/1988 | Krausse et al. | |
| 5,110,269 | A | 5/1992 | Fallon | |
| 5,159,808 | A | 11/1992 | Kast | |
| 5,168,704 | A | 12/1992 | Kast et al. | |
| 5,184,643 | A | * 2/1993 | Raymond | 137/625.48 |
| 5,245,819 | A | 9/1993 | Kast | |
| 5,447,176 | A | * 9/1995 | Asou et al. | 137/625.66 |
| 5,595,218 | A | * 1/1997 | Hallbach et al. | 137/625.18 |
| 5,848,613 | A | * 12/1998 | Sakaguchi et al. | 137/625.65 |
| 6,182,697 | B1 | * 2/2001 | Parker et al. | 137/625.16 |
| 6,666,015 | B2 | 12/2003 | Dyer | |
| 7,094,042 | B1 | 8/2006 | Borgetti et al. | |
| 7,165,949 | B2 | 1/2007 | Firnhaber | |
| 7,637,724 | B2 | 12/2009 | Cygnor | |
| 2011/0005625 | A1* | 1/2011 | Goldfarb et al. | 137/625 |
| 2011/0289925 | A1 | 12/2011 | Dyer et al. | |
| 2014/0076435 | A1* | 3/2014 | Ballard et al. | 137/565.11 |

\* cited by examiner

*Primary Examiner* — Craig Schneider
*Assistant Examiner* — Kevin Barss
(74) *Attorney, Agent, or Firm* — Carlson, Gaskey & Olds, P.C.

(57) ABSTRACT

A metering valve for a gas turbine engine fuel system includes a sleeve including first, second, third, fourth, fifth and sixth ports respectively axially spaced apart from one another. A spool is slidably received in the sleeve and includes first, second and third seal lands. The first seal land selectively connects the first and second ports to one another, and the third seal land selectively connects the third and fourth ports to one another and the fifth and sixth ports to one another.

15 Claims, 4 Drawing Sheets

GAS TURBINE ENGINE FUEL SYSTEM METERING VALVE

BACKGROUND

This disclosure relates to a metering valve for a fuel metering system.

Gas turbine engines are known, and typically include a compressor compressing air and delivering it to a combustor. The compressed air is mixed with fuel in the combustor, combusted, and the products of combustion pass downstream over turbine rotors, driving the rotors to create power.

The metering valve provides metered flow to the combustor, provides position feedback to the full authority digital engine controller (FADEC), moves in response to a FADEC command, shuts fuel flow off in response to a FADEC command and provides pressure signals to various fuel system components.

SUMMARY

In one exemplary embodiment, a metering valve for a gas turbine engine fuel system includes a sleeve including first, second, third, fourth, fifth and sixth ports respectively axially spaced apart from one another. A spool is slidably received in the sleeve and includes first, second and third seal lands. The first seal land selectively connects the first and second ports to one another, and the third seal land selectively connects the third and fourth ports to one another and the fifth and sixth ports to one another.

In another exemplary embodiment, a fuel system for a gas turbine engine includes a pump configured to pump fuel from a tank. A metering valve is fluidly connected to and arranged downstream from the pump. The metering valve includes a sleeve including first, second, third, fourth, fifth and sixth ports respectively axially spaced apart from one another. A spool is slidably received in the sleeve and includes first, second and third seal lands. The first seal land selectively connects the first and second ports to one another, and the third seal land selectively connects the third and fourth ports to one another and the fifth and sixth ports to one another. The first and fourth ports are fluidly connected to one another irrespective of spool position. The second port is fluidly connected to and downstream from the pump.

BRIEF DESCRIPTION OF THE DRAWINGS

The disclosure can be further understood by reference to the following detailed description when considered in connection with the accompanying drawings wherein.

DETAILED DESCRIPTION

Figure 1:
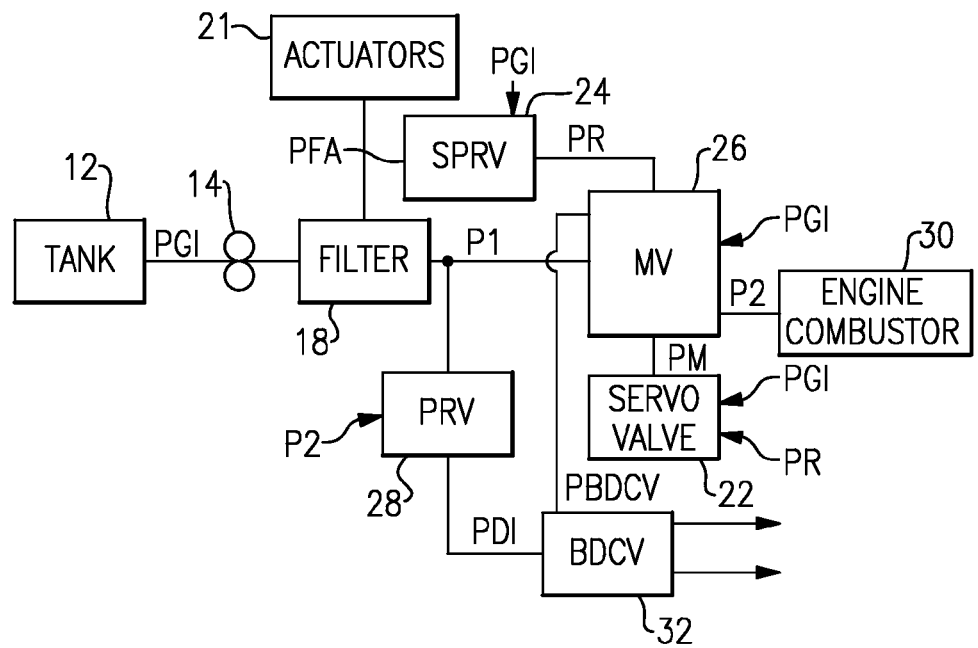
FIG. 1 is a schematic of a portion of a fuel system for a gas turbine engine.

A highly schematic view of a fuel system 10 for a gas turbine engine 30 is shown in FIG. 1. It should be understood that various fluid connections and components are omitted from the schematic for clarity. The fuel flowing in the various lines within the system 10 are labeled with the prefix "P."

The system 10 includes a pump 14 that pumps fuel from a tank 12. Fuel from the pump 14 flows through the main filter 18 to the metering valve (MV) 26 and the pressure regulating valve (PRV) 28. The pump 14 also supplies fuel PFA to fueldraulic actuators 21 and the servo pressure regulator (SPRV) 24.

Upstream fuel P1 from the pump 14 is provided to a metering valve (MV) 26. The MV 26 is responsive to main gear pump inlet fuel PGI, SPRV regulated pressure fuel PR, and a modulated pressure PM. The regulated pressure fuel PR is provided by a servo pressure regulator (SPR) 24 that is responsive to the main gear pump inlet fuel PGI and pump outlet fuel PFA. The modulated pressure PM is from a servo valve 22 that responds to FADEC commands for positioning the MV 26. The MV 26 produces a downstream pressure P2 that is provided to the engine combustor. The PRV 28 is also responsive to the upstream fuel P1 via port 44 and downstream fuel pressure P2 via port 42 to produce a bypass flow, discharge pressure fuel PDI. This bypass flow is sent to a bypass directional control valve (BDCV) 32, which sends the bypass flow back to one of two possible low pressure locations upstream of the pump, depending on the state of the BDCV. The BDVC 32 is also responsive to the pressure regulator fuel PR, the PBDCV signal from the MV and PGI.

Figure 2A:
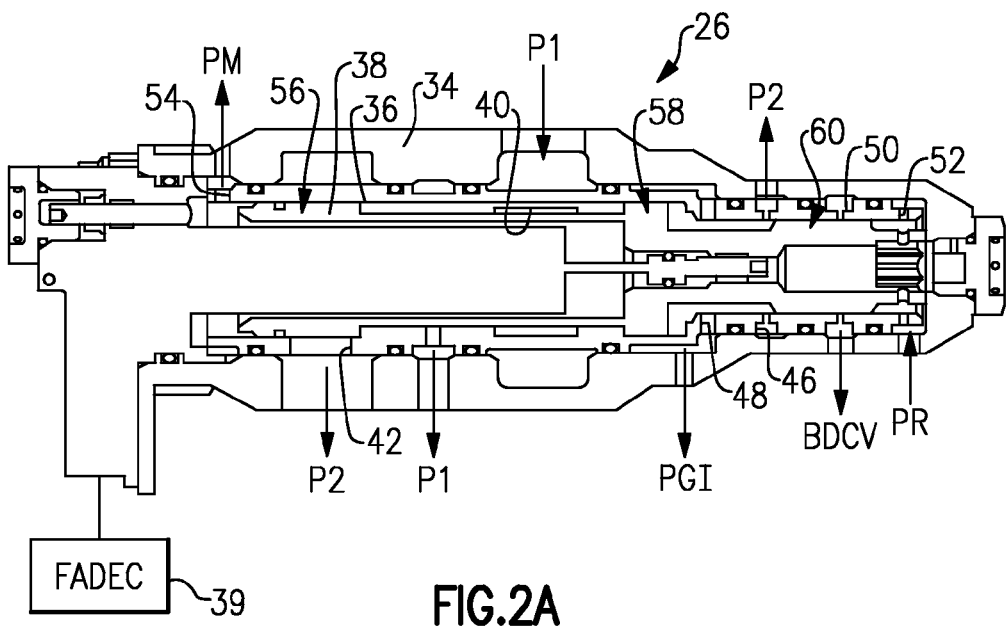
FIG. 2A is a cross-sectional view of a metering valve with a housing, sleeve and spool.
Figure 2B:
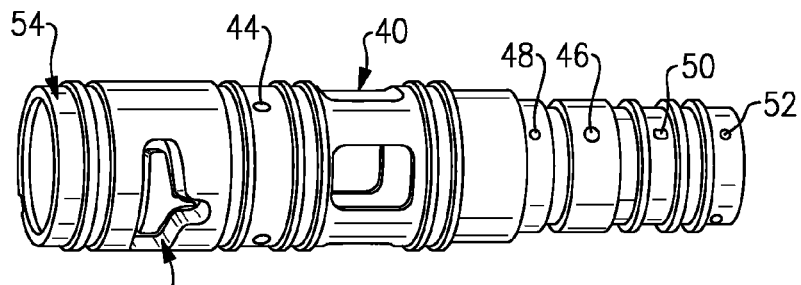
FIG. 2B is a perspective view of the sleeve illustrating various ports.

The ports and their respective flow directions are shown in FIGS. 2A and 2B. A FADEC 39 is in communication with the MV 26 through a servo valve 22 which positions the MV using the modulated pressure PM. The FADEC also receives MV position information through an LVDT connected to the MV.

The MV 26 includes a housing 34, which contains various fuel lines, schematically depicted in FIG. 1. A sleeve 36 is received in the housing 34 and sealed relative thereto by seals, such as O-rings, to fluidly separate the fuel inlets and outlets provided in the housing 34. A spool 38 is slidably received within the sleeve 36 and is responsive to fuel pressures acting on the spool 38 to selectively communicate fuel to various components within the system 10. To this end, the spool 38 includes first, second and third seal lands 56, 58, 60. The first and third seal lands 56, 60 selectively block and unblock some of the ports 40-54.

Figure 3A:
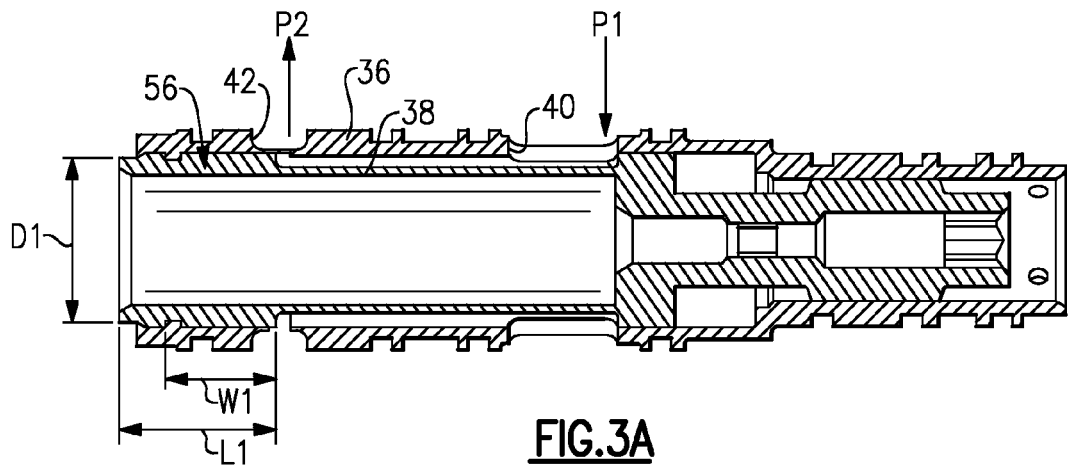
FIG. 3A is a cross-sectional view of the metering valve with the spool in a position permitting partial flow through a P2 port in the sleeve.
Figure 4A:
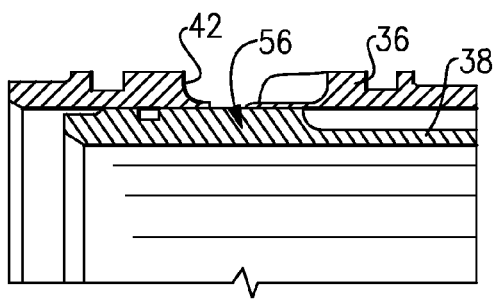
FIG. 4A is a cross-sectional view of the metering valve with the spool in the position fully blocking flow through the P2 port.
Figure 4B:
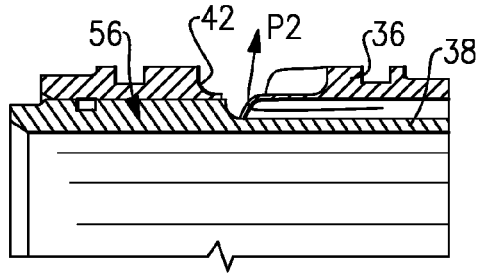
FIG. 4B is a cross-sectional view of the metering valve with the spool in the position permitting full flow through the P2 port.

Referring to FIG. 3A, the sleeve 36 includes a first P1 port selectively in fluid communication with the first P2 port 42. In particular, the first seal land 56 selectively fluidly connects the first P1 port through the annular space between the first and second seal lands 56, 58 when the first seal land 56 moves from the fully blocked position (FIG. 4A) to the fully open position (FIG. 4B). The timing of this event is determined in part by the first diameter D1, first W1 and position L1 of the first seal land 56 relative to the left end of the spool 38. In the example, the ratio L1/W1 is 1.40-1.50, and for example, 1.44; the ratio W1/D1 is 0.58-0.68, and for example, 0.63.

The second P2 port 46 is fluidly connected to the first P2 port 42 through housing plumbing lines.

Figure 6:
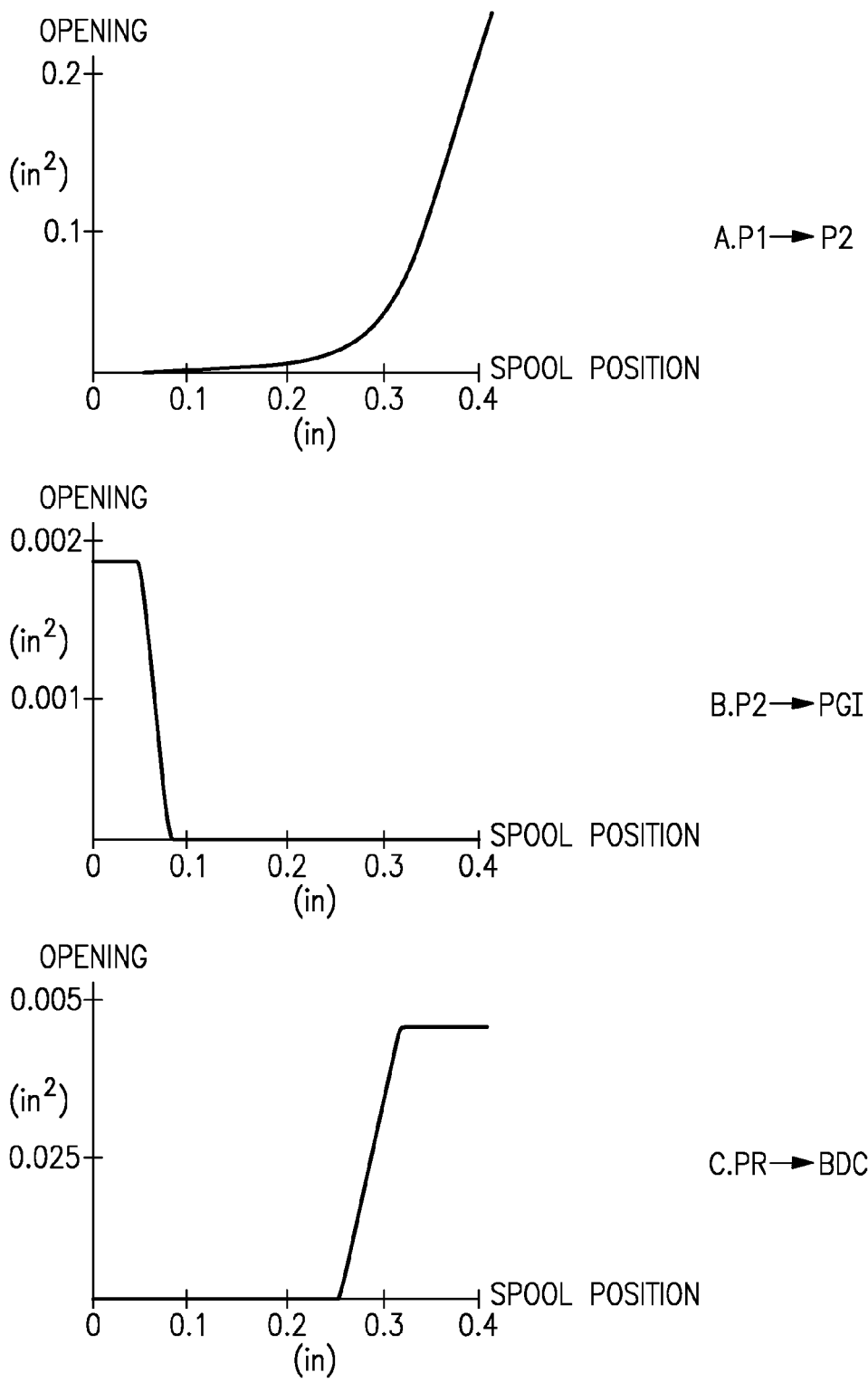
FIG. 6 graphically depicts the flow regulating area of various ports at particular spool positions; graph A depicts the flow regulating area connecting the P1 and P2 ports; graph B depicts the flow regulating area connecting the P2 and PGI ports; graph C depicts the flow regulating area connecting the PR and BDCV ports.

The first P2 port 42 includes two windows having a total area of 0.261 inch$^2$ (0.66 cm$^2$) with axially elongated portions that permits a gradual flow (as the spool 38 moves from right to left in the figure) before becoming fully opened, as graphically depicted in FIG. 6A. The first P1 port 40 includes four windows that are generally rectangular in shape to maximize flow through the port during the entire opening stroke of the spool 38. The first P1 port 40 includes a total area of 1.712 inch$^2$ (4.35 cm$^2$).

Figure 3B:
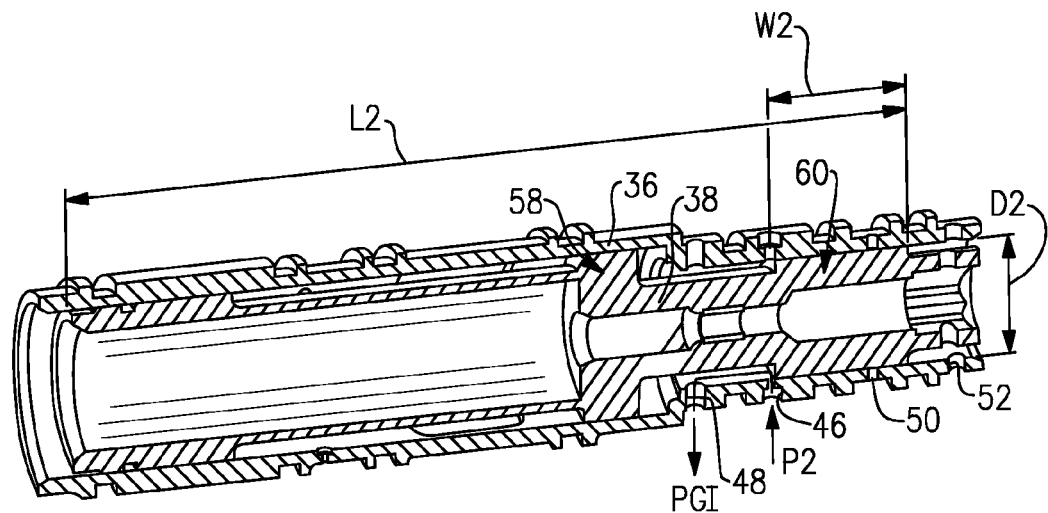
FIG. 3B is a cross-sectional perspective view of the metering valve with the spool in a position permitting flow through a P2 port in the sleeve to a PGI port.

Referring to FIG. 3B, the second P2 port 46 and the PGI port 48 are fluidly connected (with the spool 38 all the way to the right in the figure) and the first P2 port 42 fully blocked. In this position, the BDCV port 50 is blocked by the third seal land 60. The third seal land 60 is at a second position L2 from the left end and includes a second width W2 and a second diameter D2. The ratio of D2/W2 is 6.32-6.42, and for example, 6.37; the ratio of W2/D2 is 0.95-1.10, and for example 1.05. The timing of the fluid connection and change in flow regulating area between the second P2 port 46 and the PGI port 48 is graphically shown in FIG. 6B.

Figure 5A:
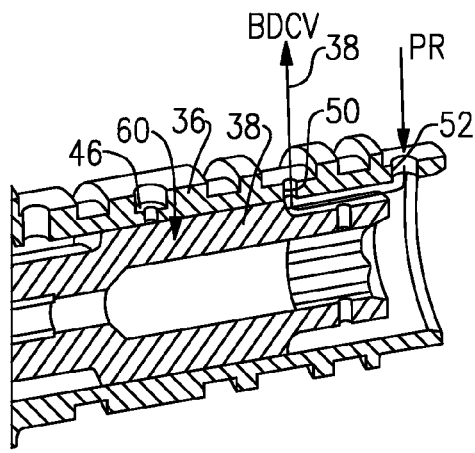
FIG. 5A is a cross-sectional perspective view of the metering valve with the spool in a position permitting flow through a PR port in the sleeve to a BDCV port.
Figure 5B:
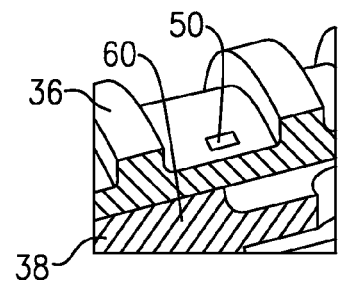
FIG. 5B is an enlarged cross-sectional perspective view of the metering valve illustrating the unblocked BDCV port.

Referring to FIGS. 5A and 5B, the PR port 52 and the BDCV port 50 are fluidly connected with the spool 38 to the left. The BDCV port 50 is rectangular in shape to maximize flow through the port. The total area of the BDCV port 50 is less than the total area of the PR port 52. The timing of the fluid connection and change in flow regulating area between the PR port 52 and the BDCV port 50 is graphically shown in FIG. 6C.

Although an example embodiment has been disclosed, a worker of ordinary skill in this art would recognize that certain modifications would come within the scope of the claims. For example, part areas may be within +/−5% of the specified areas. For that reason, the following claims should be studied to determine their true scope and content.

What is claimed is:

1. A metering valve for a gas turbine engine fuel system comprising:

a sleeve including first, second, third, fourth, fifth and sixth ports respectively axially spaced apart from one another; and a spool slidably received in the sleeve and including first, second and third seal lands, the first seal land selectively connecting the first and second ports to one another, the third seal land is an axially outermost seal land on the spool, and the third seal land selectively connecting the third and fourth ports to one another and the fifth and sixth ports to one another.

2. The metering valve according to claim 1, wherein the first and second seal lands have the same diameter, and the third seal land has a smaller diameter than the first seal land.

3. The metering valve according to claim 2, wherein the first port is near a first end of the spool, and the sixth port is near a second end of the spool opposite the first end.

4. The metering valve according to claim 3, wherein the first seal land is a first distance from the first end and includes a first width, and a ratio of the first distance to the first width is 1.40-1.50.

5. The metering valve according to claim 4, wherein the ratio of the first distance to the first width is 1.44.

6. The metering valve according to claim 4, the first seal land has a first diameter, and a ratio of the first width to the first diameter is 0.58-0.68.

7. The metering valve according to claim 6, wherein the ratio of the first width to the first diameter is 0.63.

8. The metering valve according to claim 3, wherein the third seal land is a second distance from the first end and includes a second width, and a ratio of the second distance to the second width is 6.32-6.42.

9. The metering valve according to claim 8, wherein the ratio of the second distance to the second width is 6.37.

10. The metering valve according to claim 8, the first seal land has a second diameter, and a ratio of the second width to the second diameter is 0.95-1.10.

11. The metering valve according to claim 10, wherein the ratio of the second width to the second diameter is 1.05.

12. The metering valve according to claim 1, wherein the second port includes four generally rectangular apertures.

13. The metering valve according to claim 12, wherein the total area of the second port is 1.712 inch2 (4.35 cm2).

14. The metering valve according to claim 1, wherein the fifth port includes two generally rectangular apertures.

15. The metering valve according to claim 1, wherein the total area of the first port is 0.261 inch2 (0.66 cm2).

* * * * *